United States Patent [19]
Shaughnessy et al.

[11] Patent Number: 5,689,810
[45] Date of Patent: Nov. 18, 1997

[54] METHOD OF FACILITATING TALLGROUP CALLS IN A PEER COMMUNICATION NETWORK

[75] Inventors: Mark Shaughnessy, Algonquin; Daniel McDonald, Cary; Michael Sasuta, Mundelein, all of Ill.

[73] Assignee: Motorola, Inc., Schaumburg, Ill.

[21] Appl. No.: 635,530

[22] Filed: Apr. 22, 1996

Related U.S. Application Data

[63] Continuation of Ser. No. 330,411, Oct. 28, 1994, abandoned.
[51] Int. Cl.$^6$ .................................................. H04B 7/26
[52] U.S. Cl. .................. 455/54.2; 455/34.1; 455/56.1; 379/60
[58] Field of Search .................. 455/54.1, 56.1, 455/54.2, 53.1, 34.1, 34.2, 13.1, 16; 379/59, 60, 63; 370/95.1, 95.3

[56] References Cited

U.S. PATENT DOCUMENTS

| | | | |
|---|---|---|---|
| 5,095,529 | 3/1992 | Comroe | 455/16 |
| 5,279,521 | 1/1994 | Johlie et al. | 455/54.1 |
| 5,287,542 | 2/1994 | Hesse et al. | 455/13.1 |
| 5,293,638 | 3/1994 | Sasuta et al. | 455/16 |
| 5,475,683 | 12/1995 | Harrison et al. | 370/68.1 |
| 5,504,804 | 4/1996 | Widmark et al. | 379/63 |

*Primary Examiner*—Reinhard J. Eisenzopf
*Assistant Examiner*—Lee Nguyen
*Attorney, Agent, or Firm*—George C. Pappas

[57] ABSTRACT

The present invention encompasses a method of facilitating a talkgroup call throughout a communication network (100). A typical multi-system network (100) includes a plurality of communication units (122), a plurality of communication location areas (117–119), and a plurality of system controllers (110, 116). A communication unit (122) sends a request for a talkgroup call involving members of a first talkgroup to a system controller (116). The system controller (116), after receiving the talkgroup call request, determines which other communication systems in the multi-system network (100) contain members of the requested talkgroup. The system controller (116) sends a talkgroup call command to all communication systems that presently contain members of the first talkgroup, thereby facilitating the talkgroup call throughout the communications network.

14 Claims, 7 Drawing Sheets

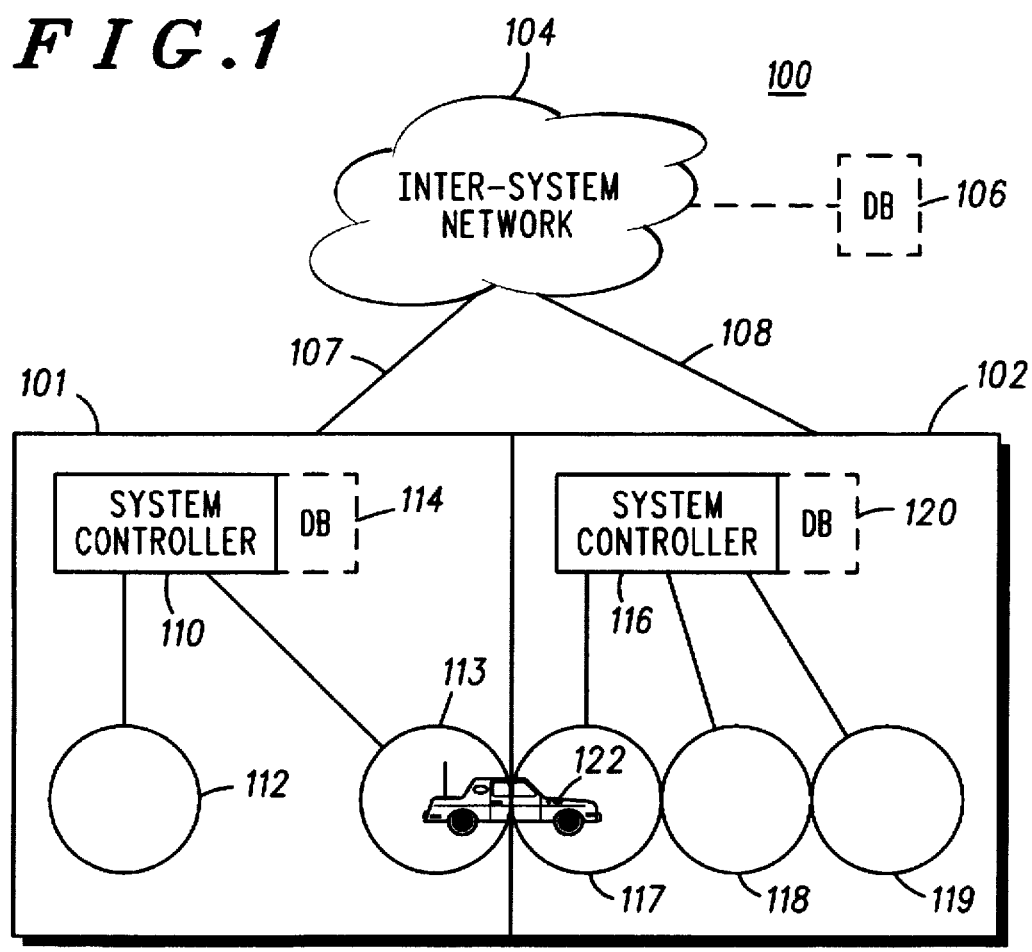

400

METHOD OF FACILITATING TALLGROUP CALLS IN A PEER COMMUNICATION NETWORK

This is a continuation of application Ser. No. 08/330,411, filed Oct. 28, 1994 and now abandoned.

FIELD OF THE INVENTION

The present invention relates generally to communication systems and, in particular, to talkgroup communication in a network of peer-to-peer communication systems.

BACKGROUND OF THE INVENTION

Land mobile radio communication systems and cellular radio/telephone communication systems are known in the art. Such systems typically include a plurality of communication units (vehicle-mounted or portable radios in a land mobile system and radio/telephones in a cellular system), a plurality of communication channels (e.g., repeaters, CDMA codes, or TDMA time slots), and a controller that controls resources and manages communication between the communication units. A talkgroup call is one in which a single communication resource is allocated to a group of communication units that can each communicate with the other units via the allocated resource. This is achieved by a system controller and a database within the communication system, tracking communication units as to location area and talkgroup membership information.

As is also known in the art, a communication system might serve a large population of communication units and include a plurality of location areas, or sites. In a multi-site land mobile communication system, communication units are capable of migrating from one location area to another while maintaining intra-system talkgroup communications. Upon entering a new location area, the communication unit typically sends its ID and talkgroup information to the system controller, which routes this information to the database. It is this location area registration that allows the system controller to track the location of the communication units.

This tracking method works well in the current multi-site communication system where a single system controller monitors and manages all the location areas and creates an audio path between one location area and other location areas necessary to complete the talkgroup call. Trunked land mobile communications, however, are now expanding to include peer-to-peer, networked communication systems. In these peer-to-peer networks, one system controller capable of linking audio paths between systems does not exist. In a land mobile multi-communication system network, once a talkgroup member leaves a communication system, that member can no longer be included in talkgroup communications.

One approach to resolving this problem, as used by cellular radio/telephone multi-communication system networks, is to utilize one or more databases to track the location for each individual communication unit. This method is similar to individual communication unit tracking in the land mobile multi-site communication system. In particular, when a communication unit enters a new system, it sends its unit ID to the system controller, which routes it to the appropriate databases. This tracking method enables communication units to make inter-system telephone calls. However, this method does not address the dynamics of group environments. That is, the method tracks only individual communication units, without tracking the groups as a whole. Thus, inter-system talkgroup calls are not currently possible using these prior art techniques.

Accordingly, there exists a need for a method of facilitating talkgroup communications across a peer-to-peer communication network. In particular, a method is needed that allows a communication unit to migrate from one communication system to another while maintaining its ability to communicate with members of the same talkgroup.

BRIEF DESCRIPTION OF THE DRAWINGS

FIG. 1 shows a radio communications system, in accordance with the invention;

FIG. 2 shows a database that may be employed in a preferred embodiment of the invention;

DETAILED DESCRIPTION OF A PREFERRED EMBODIMENT

Figure 3:
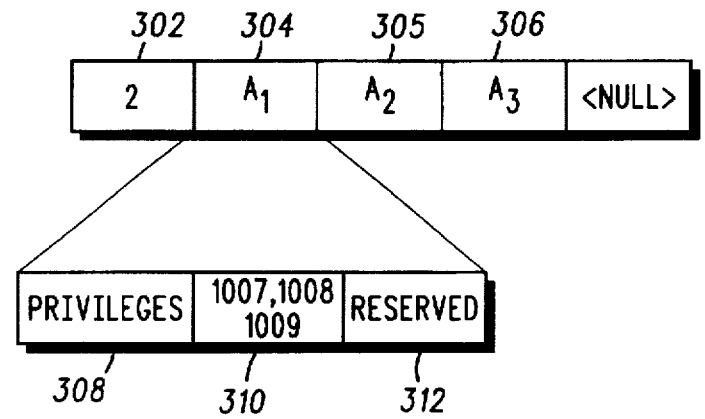
FIG. 3 shows a database that may be employed in a preferred embodiment of the invention.

Generally, the present invention encompasses a method of facilitating talkgroup communication in a communication network of peer-to-peer communication systems. A typical system includes a plurality of communication units that are members of at least one talkgroup that make talkgroup calls via a plurality of system controllers. The system controllers are coupled to at least one database, which contains talkgroup records that assist in call setup. When a communication unit migrates from one communication system to another, it sends a registration request to the system controller at the new communication system. It should be noted that migration may consist of a communication unit physically relocating to the coverage area of a new system, determining that a better signaling condition exists at a new system in an overlapping coverage area between communication systems, modifying its talkgroup affiliation, or powering on.

The methods that a communication unit utilizes to determine that it has moved into the service area of a new communication system are well known in the art. The new system controller determines whether the talkgroup is registered at the new communication system. If the talkgroup is not registered at the new system, a database is updated with the new talkgroup information, which information is used to facilitate subsequent talkgroup communications that might involve that communication unit. In this manner, talkgroup communication capabilities are maintained across system boundaries.

The present invention can be better understood with reference to FIGS. 1–10. FIG. 1 shows a simplified block diagram of a radio communication system (100) in accordance with the present invention. Two communication system networks (101, 102) hereinafter "communication systems" are connected via an inter-system network (104) and communication links (107, 108). The inter-system network typically includes a mechanism for allowing control information and call information (audio, control data, etc.) to be passed from one system to another and is optionally coupled to a main database, or Home Location Register (HLR, 106). The network may be a dedicated point-to-point mesh, a circuit switched network, a packet switched network, etc. The main database typically includes records relating the attribute and location information for each communication unit and contains talkgroup records, as described later.

Each communication system contains a plurality of communication location areas (112, 113). As known in the art, each location area includes a plurality of local resource controllers, often one per communications site, that allocates local communication resources. Each communication system can be operably coupled to a local database, or Visiting Location Register (VLR, 114) that contains talkgroup records for each of the local communication systems, as described later. A communication unit (122) can migrate from one communication system (101) and enter the service area supported by another communication system (102). Upon entering the new communication system (102), the communication unit (122) attempts to affiliate with a communication location area (117) at the new communication system. The new system controller (116) then updates its local database (120) with the information that was transmitted by the communication unit (122). The database updating is further described with reference to FIGS. 2 and 3.

FIG. 2 represents the database (106) that, in a preferred embodiment, is referred to as a centralized HLR. The talkgroup identification is stored in one field (201) of the database. The identifiers corresponding to the systems at which the talkgroup members are presently registered are stored in another field (203) of the database. In a preferred embodiment, a talkgroup record consists of the talkgroup identification and the systems at which at least one member of the talkgroup is currently registered. A talkgroup record (205) might also indicate that there are currently no talkgroup members registered in any system. Such an indication might be manifested using, for example, a null record in the systems field (203) of the database.

FIG. 3 represents a database (120) that, in a preferred embodiment, is located at the communication system's VLR. The talkgroup identification is stored in one field (302) of the database. The location areas at which at least one member of the talkgroup is currently registered are stored in separate fields (304–306) of the database. Each location area record (304) would consist of the privilege attributes (308), and a list of all communication unit IDs (310) that are currently registered at the location area. The location area record could also include other information (312) that pertains to each talkgroup, such as all talkgroup IDs currently registered in this location area.

A preferred embodiment of the present invention, as shown in FIGS. 2 and 3, includes both an HLR and multiple VLRs. The VLRs are replicas of each other, and all talkgroup records in the communication network are represented by the HLR and any one of the VLRs. There are, however, alternative embodiments for the database configurations that are possible in accordance with the present invention.

A first alternate embodiment of the system database configuration requires only an HLR. In this embodiment, each talkgroup record contains the systems at which a member of the talkgroup is currently registered. Within each system segment of the talkgroup record is a record including identifiers for those location areas containing at least one member of the talkgroup. Within each location area segment of the talkgroup record is a record that contains privilege attributes, individual communication unit IDs, and other reserved information.

A second alternative embodiment of the system databases contains multiple VLRs, but no HLR. The database information for this embodiment is identical to the HLR-only embodiment—i.e., the VLRs are replicas of each other, thereby distributing the talkgroup information across the communication system network.

Figure 4:
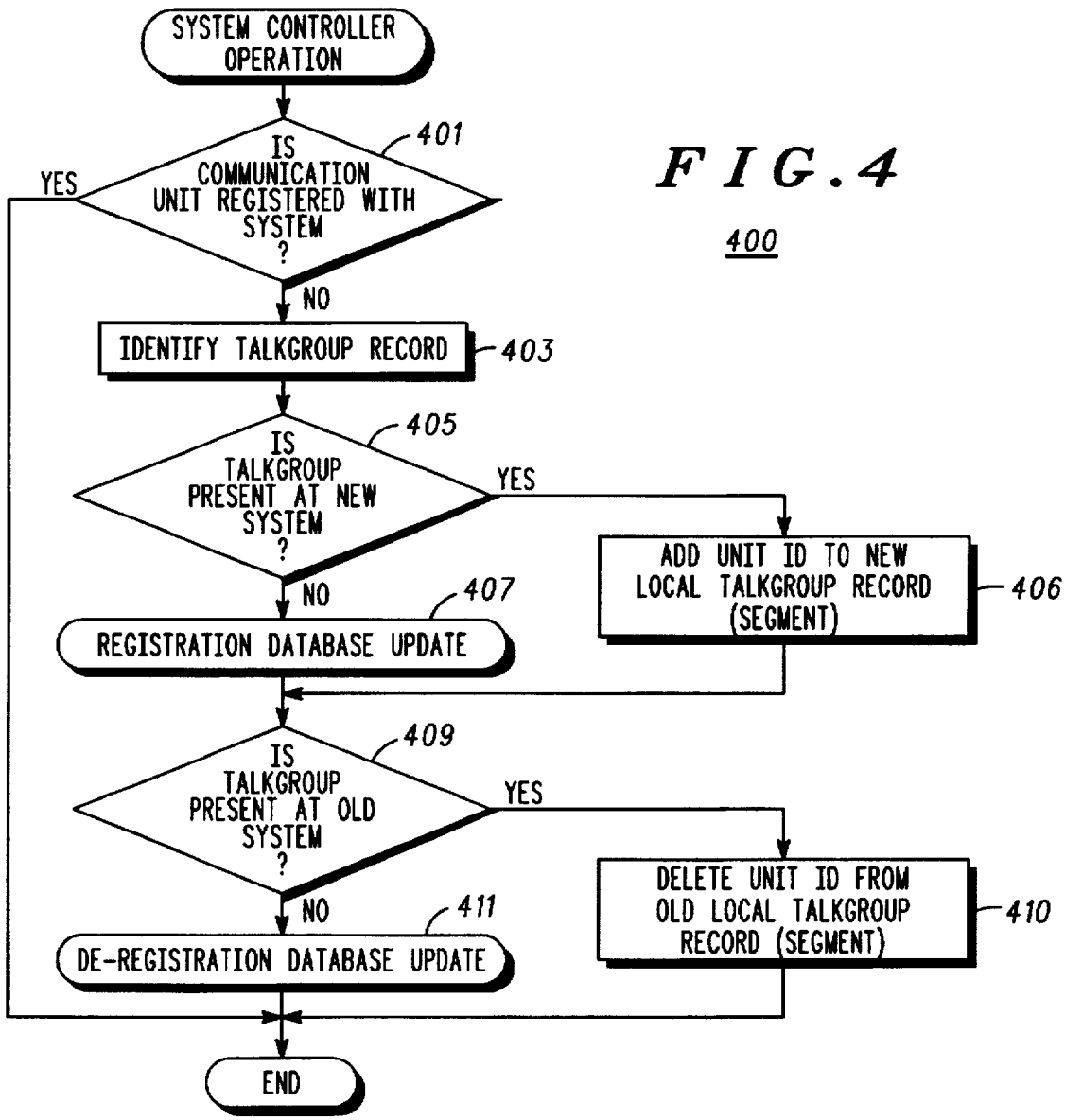
FIG. 4 shows a data flow diagram depicting a preferred method of facilitating talkgroup communication, in accordance with the present invention.

FIG. 4 shows a data flow diagram (400) depicting the operation of the communication system shown in FIG. 1. Upon migration of a new communication unit, the system controller determines (401) whether this communication unit is presently registered with the requested talkgroup at this communication system. If the migrating communication unit is presently registered with the requested talkgroup at this communication system, the routine is exited, since this indicates that the communication unit has not migrated. If the communication unit is not presently registered with the requested talkgroup at this communication system, the talkgroup record of the migrating communication unit is identified (403). A determination (405) is then made as to whether the talkgroup of the migrating communication unit is present at this communication system. If the talkgroup is present at this communication system, the communication unit ID is added (406) to the talkgroup record of the associated talkgroup. If the talkgroup is not present at the new communication system, the database will be updated (407) with the registration, as described further in FIG. 6.

After the database is updated with the registration or the communication unit ID is added to the talkgroup record, a determination (409) is made as to whether the talkgroup of the migrating communication unit is still present at the old communication system (i.e., the system from which the unit has migrated). If there are members of the talkgroup still present at the old communication system, the unit ID of the migrating communication unit is deleted (410) from the talkgroup record of the old system. If there are no members of the talkgroup remaining at the old communication system, the talkgroup records are updated (411), as further described in FIG. 7. This de-registration process enhances system performance by alleviating the need for communication systems to allocate resources for talkgroup calls when no members of a talkgroup remain at a system.

Figure 5:
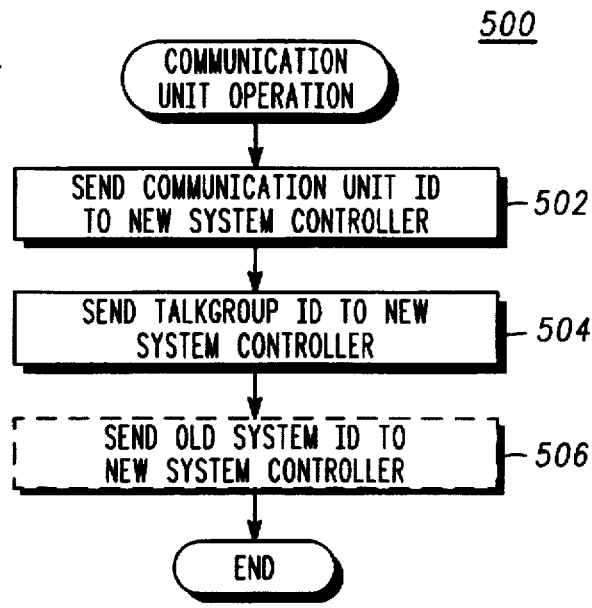
FIG. 5 shows a data flow diagram of a communication unit in accordance with the present invention.

The operation of the migrating communication unit is described in FIG. 5. After determining that it has entered a new communication system, the communication unit sends (502) its unit ID to the new system controller. In a preferred embodiment, the migrating communication unit also sends (504) its talkgroup ID to the new system controller.

Communication units may register with more than one talkgroup. If a communication unit is registered with more than one talkgroup, the talkgroup ID sent to the new system controller takes the form of a talkgroup list. This talkgroup list contains a list of all talkgroups with which the communication unit is affiliated. In an alternate embodiment, the migrating communication unit also sends (506) its old system ID to the new communication system. The new communication system uses the old system ID to quickly ascertain which other communication system needs to be updated due to this migration. The new system then communicates to the old communication system that the communication unit has migrated, and the old communication system de-registers the migrating communication unit.

Figure 6:
FIG. 6 shows a data flow diagram of a registration database update, in accordance with the present invention.

FIG. 6 shows the updating (407) of the database during registration. Upon determining that the talkgroup is not present at the new communication system, a new talkgroup record is created (601) for the talkgroup in the new communication system. In a preferred embodiment, this talkgroup record resides at the new communication system's local database, or VLR. This talkgroup record is referenced by the talkgroup identification and contains elements to track talkgroup members at this system. Each talkgroup that exists within the communication network also has a talkgroup record stored in the main database, or HLR, that contains the system IDs of the communication systems having at least one registered member of the associated talkgroup. The unit ID of the migrating communication unit is added (603) to the newly created talkgroup record. After adding the unit ID, the system ID of the new communication system is added (605) to the newly created talkgroup record.

Following the addition of the new system ID, an indication of all other communication systems that have the talkgroup of the migrating communication unit registered is added (607) to the newly created talkgroup record at the new communication system. The system ID of the new communication system is then added (609) to the talkgroup record of all systems that contain the talkgroup. For example, if a communication unit with a unit ID of 1013 is a member of talkgroup 2 and migrates from S1 to S2, a local talkgroup record is created in the VLR of S2. The unit ID, 1013, of the migrating communication unit is added to the newly created talkgroup record at the VLR of S2. The new system ID, S2, is added to the talkgroup record at the HLR, and the newly created talkgroup record at the new communication system adds the systems IDs of all other systems that have at least one registered member of talkgroup 2. S2 is then added as a system containing talkgroup 2 in all other VLRs at which talkgroup 2 is present.

Figure 7:
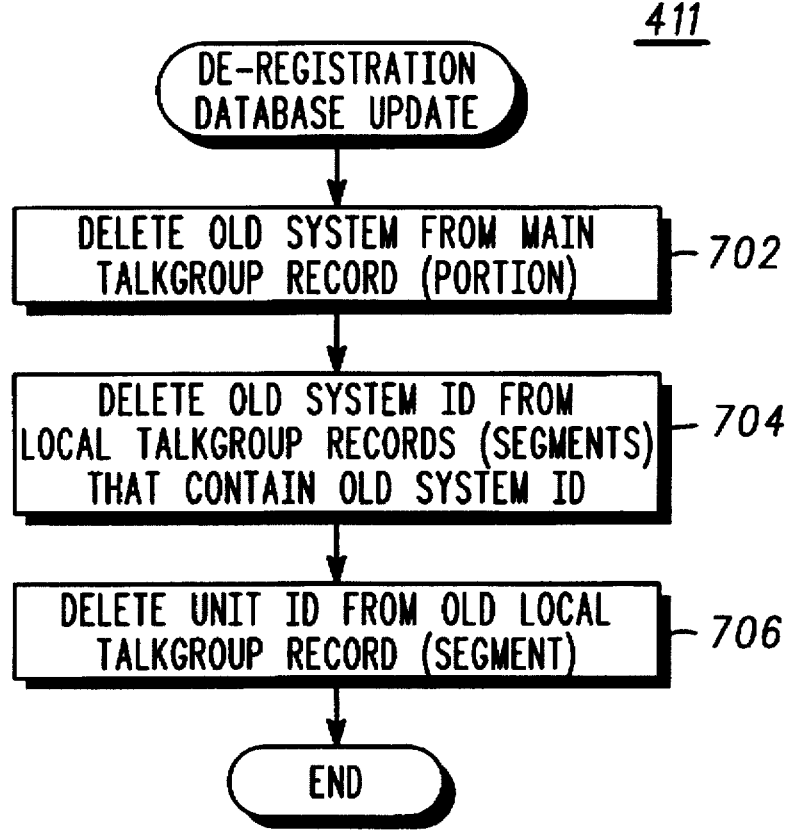
FIG. 7 shows a data flow diagram of a de-registration database update, in accordance with the present invention.

FIG. 7 shows the updating process (411) of the database during de-registration. The system ID of the communication system that the migrating communication unit is leaving (i.e., the "old" system) is deleted (702) from the main talkgroup record. The old system ID is also deleted (704) from local talkgroup records that contain the old communication system ID. The unit ID of the migrating communication unit is deleted (706) from the talkgroup record at the old communication system. In a preferred embodiment, when a communication unit powers off, it sends an indication to the system controller to remove its talkgroup association with the present communication system. This de-registration occurs for all talkgroups with which the communication unit was previously registered.

Figure 8:
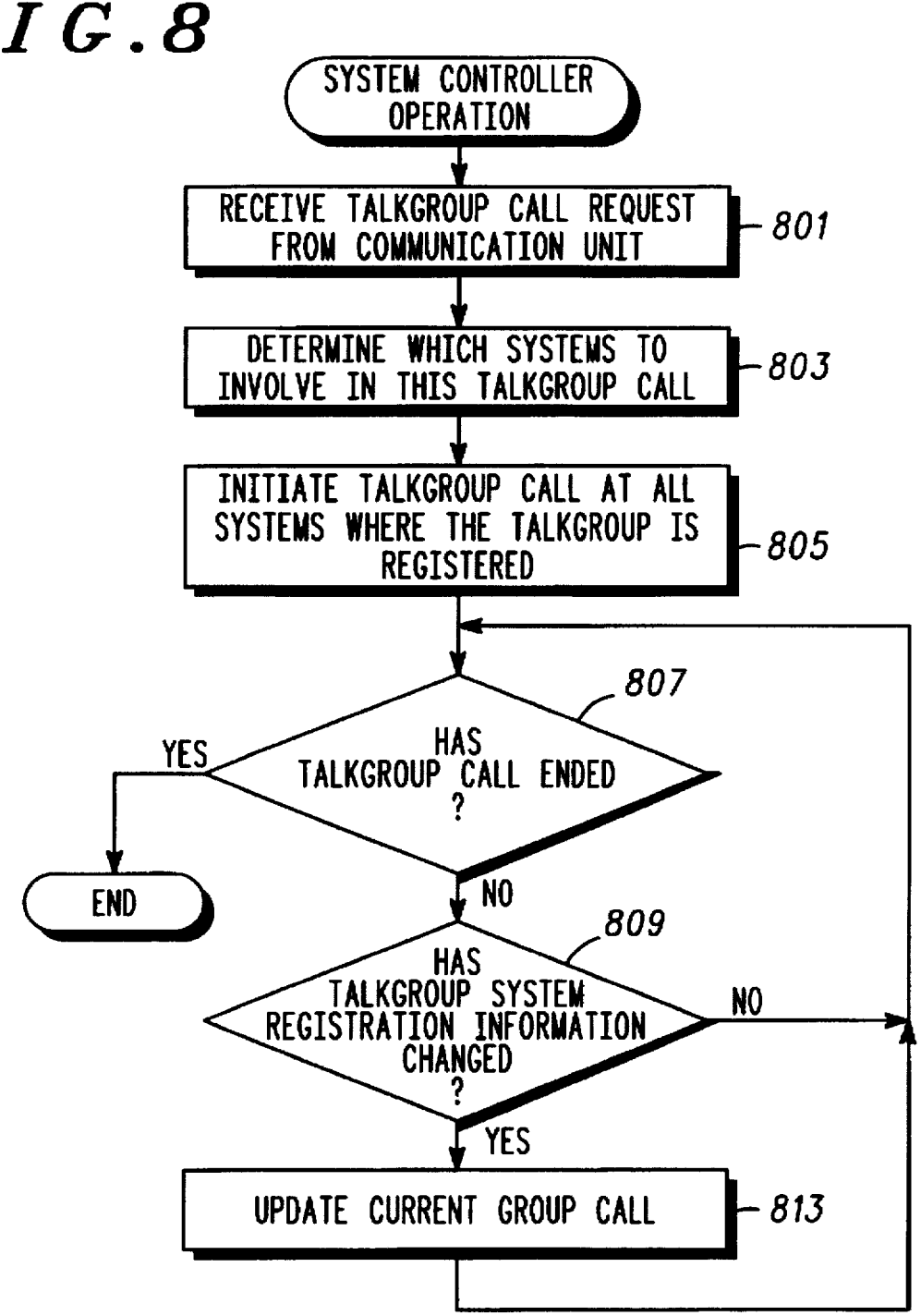
FIG. 8 shows a data flow diagram depicting a preferred embodiment for facilitating a talkgroup call, in accordance with the present invention.

FIG. 8 depicts the maintaining of a talkgroup call to include all communication systems that contain members of the requested talkgroup. Upon receipt (801) of a talkgroup call request, the system controller determines (803) which systems to involve in the talkgroup call by accessing the VLR database to determine which location areas contain members of the requested talkgroup. The talkgroup call is then initiated (805) at all systems where the talkgroup is registered. During the call, the system controller monitors the call to determine (807) whether or not the talkgroup call has ended. If the call has not ended (i.e., during the call), the system controller determines (809) whether or not the talkgroup registration information has changed. When the talkgroup system registration information changes, the current group call is updated (813), so as to include the system containing the new talkgroup member in the ongoing talkgroup call. This inclusion involves assigning appropriate communication channel resources at the new communication system and establishing the necessary call connections to allow this system to participate in this talkgroup call. If there are no talkgroup members remaining at a system that was involved in an ongoing talkgroup call, the system will de-assign all resources that were involved in the talkgroup call.

Figure 9:
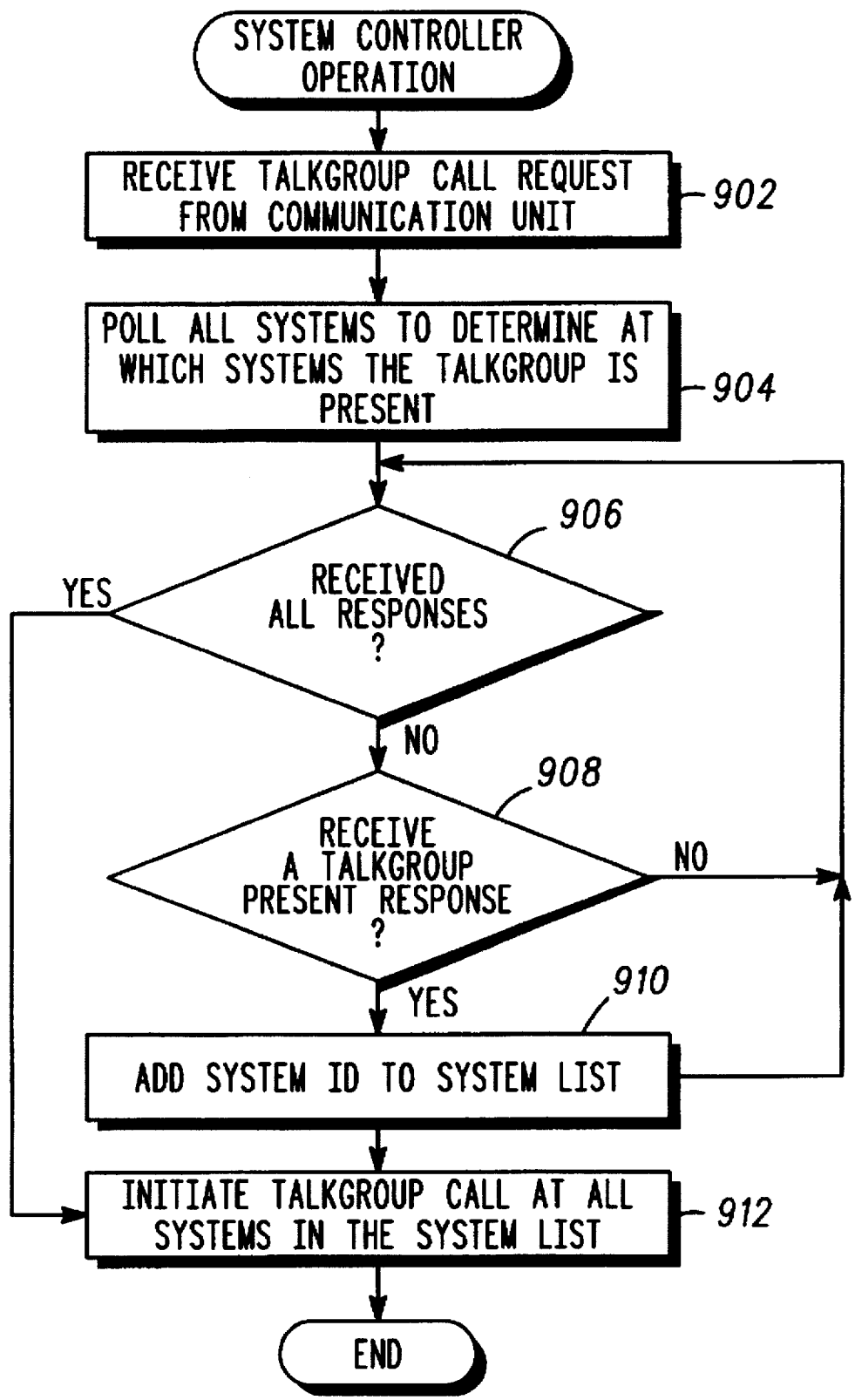
FIG. 9 shows a data flow diagram depicting a polling method of facilitating a talkgroup call, in accordance with the present invention.

FIG. 9 shows a method of maintaining a talkgroup call through the use of a polling mechanism. When a system controller receives (902) a talkgroup call request, the controller polls (904) all systems to determine which of the systems contain members of the talkgroup. Upon receipt of a response from one of the polled communication systems, the controller determines (906) whether or not all of the responses have been received. In a preferred embodiment, if all of the responses have not been received, the system controller determines (908) whether the response is an indication that the talkgroup is present at the responding system. If the response received is a talkgroup present response, the system ID of the responding system is added (910) to the talkgroup list. Once all responses have been received by the system controller, the talkgroup call is initiated (912) at all systems in the system list, as is known in the art.

In an alternative embodiment, the system controller can initiate the talkgroup call before all of the responses have been received, and add any systems that respond after the call has been initiated into the ongoing talkgroup call.

Figure 10:
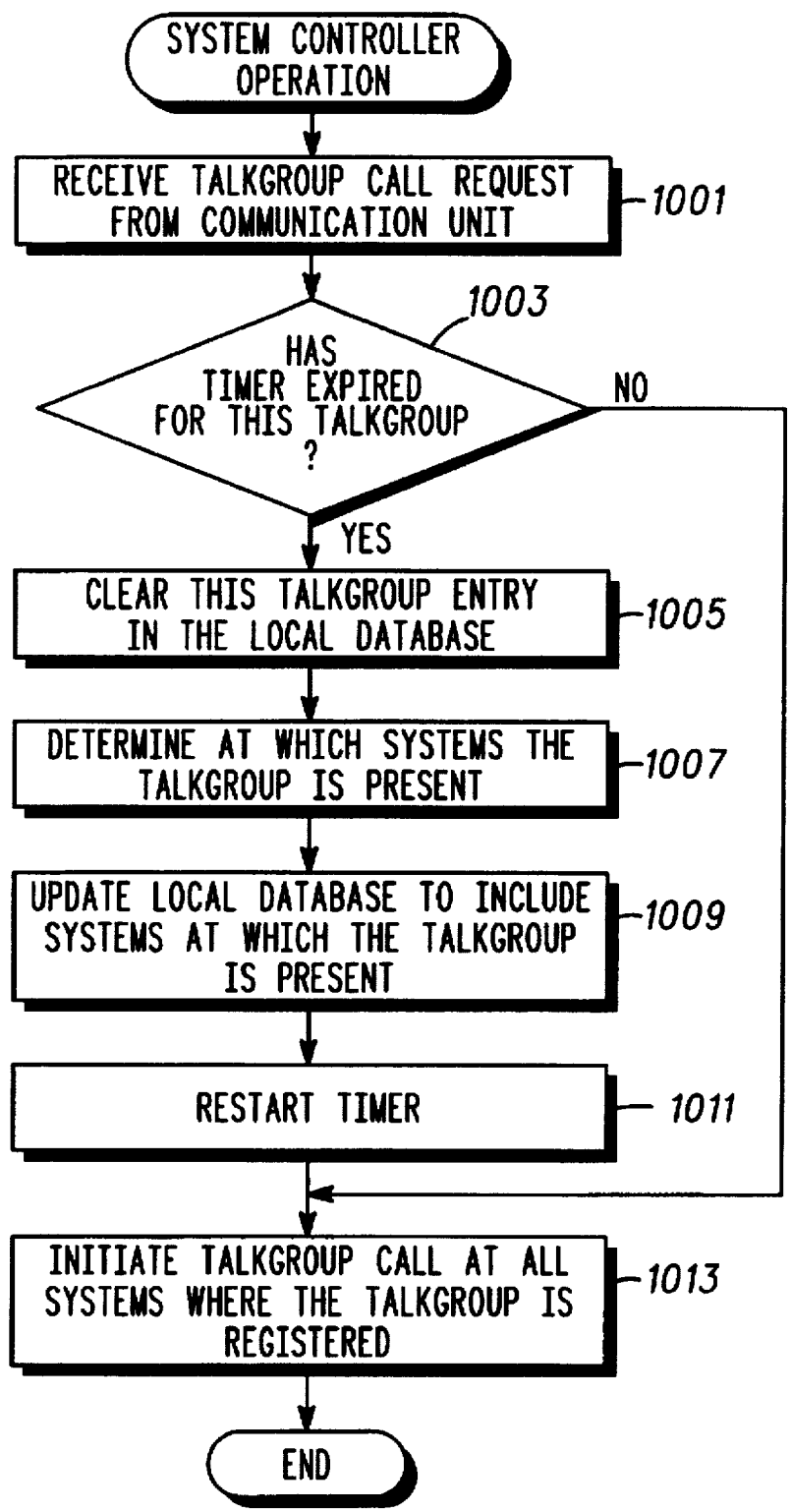
FIG. 10 shows a data flow diagram depicting a timer-based method of facilitating a talkgroup call, in accordance with the present invention.

FIG. 10 shows a method of maintaining a talkgroup call through the use of a timer mechanism. When a system controller receives (1001) a talkgroup call request from a communication unit, the controller monitors (1003) a timer for the requested talkgroup. If the timer for the talkgroup has expired, the talkgroup entry in the VLR is cleared (1005) for this talkgroup. In a preferred embodiment, the timer value correlates to the average time between talkgroup migrations. During this time period, the VLR record of this talkgroup, reflecting active location areas of the talkgroup and corresponding attributes of the talkgroup, is considered valid. The system controller then determines (1007) the systems at which the talkgroup is present, and updates (1009) the local VLR to include the identifiers for those systems at which the talkgroup is present. The timer is restarted (1011) at the system controller. The talkgroup call is then initiated (1013) at all systems that have at least one member of the talkgroup registered. In this manner, there is a reduction in the number of local database transactions necessary to track the talkgroup locations and to allow the processing of talkgroup calls. This translates into less expensive inter-system communication requirements, while decreasing the accuracy of the talkgroup information contained in the VLRs.

The present invention provides a method for facilitating talkgroup communications across a multi-system communication network of peer-to-peer systems. This is accomplished through the use of networked databases that keep track of talkgroups by monitoring communication units as they migrate across communication system boundaries in the network. By tracking communication units in this manner, the databases provide the information (e.g., talkgroup affiliation) needed to maintain talkgroup capabilities. Thus, the system controllers are able to facilitate intersystem talkgroup communications, which was not possible in prior art land mobile communication systems.

What is claimed is:

1. In a communications network that includes a plurality of peer-to-peer communication system networks, wherein each system network includes a system controller and a plurality of location areas, a method of facilitating a talkgroup call throughout the communications network, the method comprising the steps of:

at a first communication unit of a plurality of communication units that are members of at least a first talkgroup, sending a request for a call involving members of the first talkgroup to a first system controller via a local resource controller within a location area at a first communication system network;

at the first system controller, receiving the request from the first communication unit;

determining which of the plurality of communication system networks presently contain members of the first talkgroup; and selectively sending a talkgroup call command to those communication system networks presently containing members of the first talkgroup, thereby facilitating the talkgroup call throughout the communications network.

2. The method of claim 1, wherein the step of determining comprises the step of accessing a first database to determine which of the plurality of the system networks contain members of the first talkgroup.

3. The method of claim 1, wherein each system controller is operably coupled to at least a first database that contains talkgroup records indicating, inter alia, which location areas presently contain members of an associated talkgroup, the method further comprising the step of, at the first communication unit, sending an identifier associated with the first communication unit.

4. The method of claim 3, wherein the identifier is a talkgroup ID associated with the first talkgroup, the method further comprising the step of, at the first system controller, using the talkgroup ID to identify a first talkgroup record stored in the first database.

5. The method of claim 3, wherein the identifier is a unit ID that uniquely identifies the first communication unit, the method further comprising the steps of:

at the first system controller, using the unit ID to identify an associated talkgroup ID from a database; and using the associated talkgroup ID to identify a first talkgroup record stored in the first database.

6. The method of claim 1, wherein the step of determining comprises the step of identifying a second communication system network containing members of the first talkgroup.

7. The method of claim 6, wherein the step of identifying comprises the steps of:

polling at least the second communication system network; and receiving a response from the second communication system indicating whether the first talkgroup is registered in the second communication system.

8. The method of claim 7, further comprising the step of, at the first communication system network, receiving a response from the second communication system network indicating whether the first talkgroup is registered in the second communication system network.

9. The method of claim 6, wherein the step of identifying comprises the steps of:

determining whether a timer associated with the first talkgroup has expired;

when the timer has expired, determining which communication system networks contain members of the first talkgroup; and during the period the timer has not expired, utilizing a previously stored determination of which communication system networks contain members of the first talk group.

10. The method of claim 6, wherein a first database is operably coupled to at least the second communication system network, and wherein the step of identifying comprises the steps of:

retrieving the first talkgroup record from the first database; and determining whether an identifier of the second communication system network is present in the first talkgroup record.

11. In a communications network that includes a plurality of peer-to-peer communication system networks, wherein each communication system network includes a system controller, a method of facilitating a talkgroup call throughout the communications network, the method comprising the steps of:

at a first communication unit of a plurality of communication units that are members of at least a first talkgroup, sending a request for a call involving members of the first talkgroup to a first system controller at a first communication system network;

at the first system controller, receiving the request from the first communication unit;

identifying a second communication system network containing members of the first talkgroup; and selectively sending a talkgroup call command to the second communication system network, thereby facilitating the talkgroup call throughout the communications network.

12. The method of claim 11, wherein the step of identifying comprises the steps of:

polling at least the second communication system network; and receiving a response from the second communication system network indicating whether the first talkgroup is registered in the second communication system network.

13. The method of claim 11, wherein the step of identifying comprises the steps of:

determining whether a timer associated with the first talkgroup has expired; and when the timer has expired, determining whether a second communication system network contains members of the first talkgroup; and during the period the timer has not expired, utilizing a previously stored determination of which communication system networks contain members of the first talkgroup.

14. In a communications network that includes a plurality of peer-to-peer communication system networks, wherein each communication system network includes a system controller, a method of facilitating a talkgroup call throughout the communications network, the method comprising the steps of:

at a first communication unit of a plurality of communication units that are members of at least a first talkgroup, sending a request for a call involving members of the first talkgroup to a first system controller at a first communication system network;

at the first system controller, receiving the request from the first communication unit;

retrieving the first talkgroup record from a first database;

determining whether an identifier of a second communication system network is present in the first talkgroup record; and when the second communication system network is present in the first talkgroup record, selectively sending a talkgroup call command to the second communication system network, thereby facilitating the talkgroup call throughout the communications network.

* * * * *